S. P. Clemons,
Cattle Poke.
No. 102,497. Patented May 3, 1870.
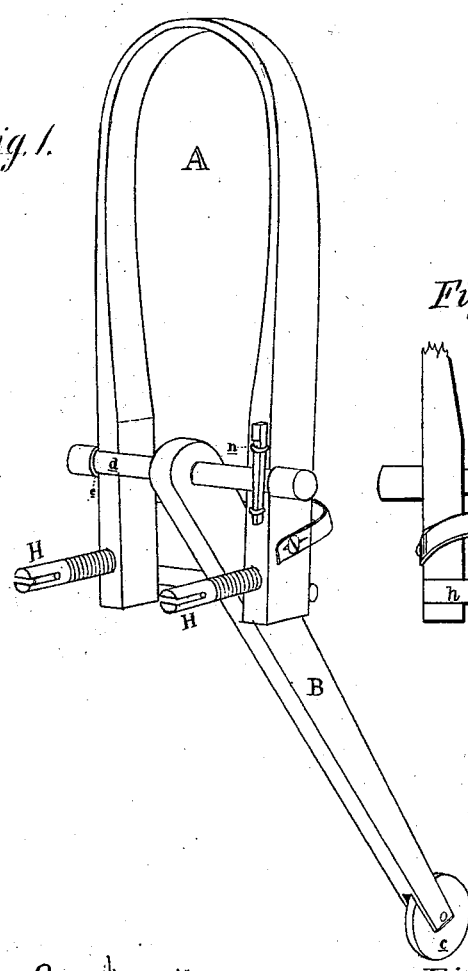
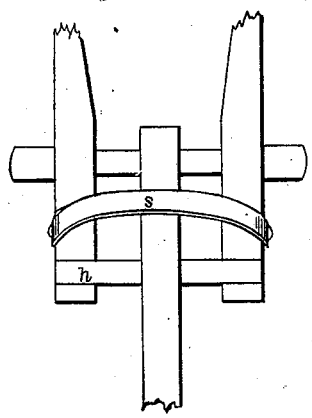
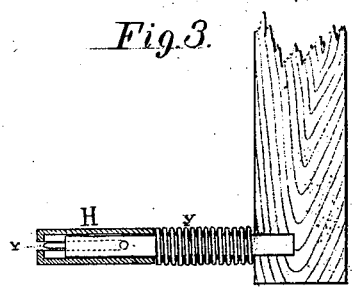
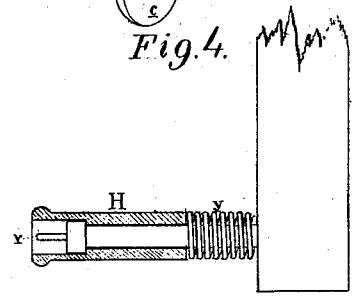
Witnesses
E. W. Anderson.
D. D. Kane
Inventor
S. P. Clemons.
Chipman, Hosmer & Co.
Attorneys.

United States Patent Office.

SAMUEL P. CLEMONS, OF DANSVILLE, NEW YORK.

Letters Patent No. 102,497, dated May 3, 1870; antedated April 22, 1870.

IMPROVEMENT IN CATTLE-POKES.

The Schedule referred to in these Letters Patent and making part of the same.

*To all whom it may concern:*

Be it known that I, SAMUEL P. CLEMONS, of Dansville, in the county of Livingston and State of New York, have invented a new and valuable Improvement in Cattle-Pokes; and I do hereby declare that the following is a full, clear, and exact description of the construction and operation of the same, reference being had to the annexed drawings making a part of this specification, and to the letters and figures of reference marked thereon.

Figure 1 of the drawings is a plan view of my poke.

Figure 2 is a view of a section thereof from the bottom, and

Figures 3 and 4 are details.

My invention relates to means for restraining unruly animals, and it consists mainly in a novel and useful arrangement of devices that serves as a poke to prevent such animals from jumping or pushing down fences.

A of the drawings represents a wooden bow adapted for hanging upon an animal's neck, and B is a swinging-bar, with roller at its front end, and cross-heads or pintles at its rear end, as shown.

The roller of the bar is marked $c$, and the cross-heads $d$ and $h$, respectively.

The cross-head $d$ is arranged at the extreme rear end of bar B, and is attached to the bow A by means of a staple, $e$, and the staples and pins $n$.

The cross-head $h$ rests against the front side of the lower end of the bow, but is not fastened thereto.

The letter $s$ represents a leather strap extending from one side of the bow to the other, and serves as a means for keeping the swinging bar in place.

H represents a metallic shield inclosing a spur or pin, $v$, and resting upon a coiled spring, $y$.

One of these shields, with its inclosure and attachment, is placed upon each lower end of the bow, and upon the rear sides thereof, and when the poke is in use the rear ends of said shields respectively rest against the animal's breast. It follows that when the animal presses the poke or its breast against a fence to cast it down, the shields force the springs inward and uncover the spurs, allowing the sharp points thereof to prick the mischievous animal in the breast till he is content to let the fence remain.

I claim—

The combination and arrangement of the roller $c$ with the bar B, cross-heads $d$ and $h$, strap $s$, bow A, and shield springs and spurs, as described, as and for the purposes specified.

In testimony that I claim the above, I have hereunto subscribed my name in the presence of two witnesses.

S. P. CLEMONS.

Witnesses:
 JACOB J. GILDS,
 C. R. KERN.